United States Patent
Blum

(10) Patent No.: US 9,511,328 B2
(45) Date of Patent: Dec. 6, 2016

(54) METHOD FOR SEALING MEMBRANE MODULES

(75) Inventor: Stephan Rüdiger Blum, Calgary (CA)

(73) Assignee: WHITEFOX TECHNOLOGIES LIMITED, London (GB)

(*) Notice: Subject to any disclaimer, the term of this patent is extended or adjusted under 35 U.S.C. 154(b) by 861 days.

(21) Appl. No.: 13/129,261

(22) PCT Filed: Nov. 3, 2009

(86) PCT No.: PCT/DE2009/001530
§ 371 (c)(1),
(2), (4) Date: Jul. 26, 2011

(87) PCT Pub. No.: WO2010/054620
PCT Pub. Date: May 20, 2010

(65) Prior Publication Data
US 2011/0272889 A1      Nov. 10, 2011

(30) Foreign Application Priority Data

Nov. 13, 2008   (DE) .......................... 10 2008 057 251

(51) Int. Cl.
| | | |
|---|---|---|
| *E04B 1/682* | (2006.01) | |
| *B01D 63/02* | (2006.01) | |
| *B01D 63/06* | (2006.01) | |
| *B01D 65/00* | (2006.01) | |
| *B01D 65/10* | (2006.01) | |

(52) U.S. Cl.
CPC ............ *B01D 63/02* (2013.01); *B01D 63/023* (2013.01); *B01D 63/062* (2013.01); *B01D 65/003* (2013.01); *B01D 65/106* (2013.01); *B01D 2313/02* (2013.01)

(58) Field of Classification Search
USPC ......... 277/316, 315, 905; 210/321.8, 321.78, 210/321.79
See application file for complete search history.

(56) References Cited

U.S. PATENT DOCUMENTS

| | | | | |
|---|---|---|---|---|
| 3,141,685 A | * | 7/1964 | Watts | 285/93 |
| 3,498,909 A | * | 3/1970 | Littman | 210/652 |
| 3,554,581 A | * | 1/1971 | Mason et al. | 285/367 |
| 4,480,861 A | * | 11/1984 | Cann, Jr. | 285/334.2 |
| 4,637,618 A | * | 1/1987 | Valls | 277/626 |
| 4,741,542 A | * | 5/1988 | Kimerly | 277/316 |
| 4,901,395 A | * | 2/1990 | Semrau | 16/2.2 |
| 4,961,760 A | * | 10/1990 | Caskey et al. | 210/321.89 |
| 4,990,251 A | | 2/1991 | Spranger et al. | |
| 5,103,915 A | * | 4/1992 | Sweeney et al. | 166/379 |
| 5,160,615 A | * | 11/1992 | Takagi et al. | 210/321.8 |
| 5,236,586 A | * | 8/1993 | Antoni et al. | 210/321.8 |

(Continued)

FOREIGN PATENT DOCUMENTS

| | | |
|---|---|---|
| EP | 0355325 | 2/1990 |
| JP | 5168875 | 7/1993 |

(Continued)

*Primary Examiner* — Kristina Fulton
*Assistant Examiner* — Eugene G Byrd
(74) *Attorney, Agent, or Firm* — K&L Gates LLP

(57) ABSTRACT

A method for sealing a membrane module by introducing a seal or a sealing mass between a head plate holding a tube bundle and a mounting ring holding the head plate. Alternatively, a sealing mass containing quartz sand is proposed for sealing cracks in the head plate.

18 Claims, 1 Drawing Sheet

(56) References Cited

U.S. PATENT DOCUMENTS

| | | | |
|---|---|---|---|
| 5,339,991 A * | 8/1994 | Snyder | 222/136 |
| 5,411,662 A | 5/1995 | Nicolas et al. | |
| 5,554,283 A * | 9/1996 | Brinda et al. | 210/321.8 |
| 6,481,927 B2 * | 11/2002 | Rhodes | 405/36 |
| 6,582,496 B1 | 6/2003 | Cheng et al. | |
| 6,932,355 B1 * | 8/2005 | Hjertholm | 277/614 |
| 7,144,443 B2 * | 12/2006 | Gerner et al. | 95/46 |
| 7,264,725 B2 * | 9/2007 | Vido et al. | 210/321.88 |
| 7,410,582 B2 * | 8/2008 | Bernard et al. | 210/321.89 |
| 7,464,913 B2 * | 12/2008 | Werner et al. | 251/329 |
| 7,678,177 B2 * | 3/2010 | Nichols | 95/52 |
| 7,713,331 B2 * | 5/2010 | Gerner et al. | 95/46 |
| 7,998,254 B2 * | 8/2011 | Burban et al. | 96/10 |
| 2003/0029785 A1 | 2/2003 | Dannenmaier | |
| 2004/0251010 A1 | 12/2004 | Doh et al. | |
| 2008/0128348 A1 | 6/2008 | Blum | |
| 2009/0004538 A1 | 1/2009 | Heggemann et al. | |
| 2011/0163510 A1 * | 7/2011 | Wedi | 277/644 |

FOREIGN PATENT DOCUMENTS

| | | |
|---|---|---|
| WO | WO03051495 | 6/2003 |
| WO | WO 2006/087214 | 2/2006 |
| WO | WO 2007/076855 | 7/2007 |

* cited by examiner

METHOD FOR SEALING MEMBRANE MODULES

PRIORITY CLAIM

This is a U.S. national stage of Application No. PCT/DE2009/001530, filed on Nov. 3, 2009, which claims priority to German Application No: 10 2008 057 251.9, filed: Nov. 13, 2008, the contents of which are incorporated herein by reference.

BACKGROUND OF THE INVENTION

1. Field of the Invention

The invention is directed to a method for sealing membrane modules, particularly those in which a bundle of tubes or a bundle of hollow fibers with a plurality of tubes or hollow fibers, particularly porous tubes or hollow fibers, having a membrane are held at the end thereof by a head plate and is tightly sealed. Tubes and tube bundles, particularly hollow fiber bundles, which are made of a plastic or a plastics composite, possibly also with a layered construction, a ceramic, or a metal are used for this purpose.

2. Related Art

In fuel cells, a fuel component is conveyed in bundled tubes or hollow fibers of this kind. For this reason, a tube of this kind, which is designed as a microreactor, is also routinely provided with a membrane through which the fuel components reacting with one another are separated.

Another area in which tube bundles of this kind are used is in the refining of propellants made of biologically renewable materials, e.g., bioethanol. When bioethanol flows through a tube forming a semi-permeable membrane, the water present in the bioethanol is extracted through the membrane. Membrane modules of this type are described, for example, in WO 2006/087214.

Tube bundles of the kind mentioned above are held at their ends in a head plate and sealed by potting. Accordingly, the ends of the tube bundles are enclosed with one another and, at the same time, a tight sealing is carried out relative to a housing, a pipeline, or the like using sealing rings. Synthetic resins, e.g., epoxy resin, or, as is described in WO 2007/076855, metals and metal alloys are used for potting.

The use of different materials which, of course, have different thermal expansion coefficients leads to substantial thermal stresses which can cause cracks, fractures, and so on, and which can therefore give rise to leaks in the region of the head plate, which routinely leads to a breakdown of the entire apparatus.

Besides frequent leaks due to defective or poorly fitting seal rings, fractures of the head plates also occur routinely. In this connection, two typical forms of fracture can be distinguished. One form of fracture are circular, crescent-shaped fractures that extend axially in an outer layer of the head plate.

Radial fractures are inconspicuous upon visual inspection of the potting surface. However, these cracks are clearly discernable when a mounting ring holding the head plate is removed. These cracks are apparent under the sealing rings between the mounting ring and the head plate and propagate in the crystalline portions of the head plate, often branching out, and it is quite possible for the entire piece of head plate to break off.

To detect defects of this kind, which can routinely result in leaks, it is necessary to detach the mounting ring, remove the head plate with tube bundles and a housing and subject them to a visual inspection. If defects are discovered, these inserts of the membrane module are simply replaced. This is cumbersome and expensive.

SUMMARY OF THE INVENTION

Therefore, it is necessary to provide a method by which leaky and, therefore, malfunctioning or defective membrane modules of the type mentioned above can be sealed in a simple manner.

There are different methods available for repairing defective seals due to radially extending cracks in the head plate of a membrane module of the type mentioned above. Specifically, the intention is to introduce an additional seal between a head plate holding a tube bundle and a mounting ring holding the head plate for sealing radial cracks. An additional seal of this kind added to an otherwise conventional O-ring between the mounting ring and the head plate so as to extend axially can be formed separately, for example, in the manner of a sealing ring, preferably in the form of a sealing strip or by a sealing mass that is pressed into a gap between the head plate and mounting ring.

The sealing strip, constructed as a separately formed axially extending sealing strip, replaces the (defective) O-ring and, further, will reliably seal radial cracks in the head plate which are located axially in front of the O-ring. If it is established that there are cracks extending axially beyond the O-ring or if the O-ring is completely unusable, e.g., cracked or deformed, then, proceeding past the O-ring axially, a sealing mass under pressure can fill a radial gap between the mounting ring and the head plate as well as the annular groove for the O-ring itself and, if required, can seal the head plate along its entire axial extension.

Further, in one embodiment using a separately formed sealing ring, a sealing ring of this kind which is made of Teflon and has a T-shaped cross section is provided, one leg of the sealing ring being inserted between the head plate and the mounting ring and the two other legs being braced axially against an upper side of a head plate and radially against the inner side of the mounting ring by means of an auxiliary ring.

In addition to sealing radial cracks and/or fractures axially in front of an O-ring between the head plate and mounting ring, the above-mentioned cracks extending axially and in a crescent shape at the outside edge in the head plate can accordingly also be sealed.

Moreover, a malfunctioning of the O-ring between the head plate and the mounting ring is eliminated without mandatory exchange of this O-ring.

When using a sealing ring of this type, which has a T-shaped cross section and is made of PTFE, this sealing ring is preferably pressed in such that its material also fills the cracks, holes, or the like in the head plate as far as possible. To this end, it can be provided that the auxiliary ring is braced axially against the head plate, for example, by the force of a spring against a cap which overlaps the head plate. Alternatively or in addition, a spring force can be generated both radially and axially by the geometry of the auxiliary ring, e.g., by using a corrugated metal ring.

When the gap between the head plate and the inner side of the mounting ring is grouted with a sealing mass, permanently elastic silicones that have a high temperature stability and are free of solvents are preferably used as sealing material.

Further, in order to enhance the mechanical and chemical stability of sealing masses of this kind, a quartz sand whose grain is naturally adapted to the size of the crack can be added to the sealing mass.

BRIEF DESCRIPTION OF DRAWINGS

The methods according to the invention will be described more fully with reference to the drawings in which embodiment examples are shown only schematically. In the drawings.

DETAILED DESCRIPTION OF DRAWINGS

Figure 1:
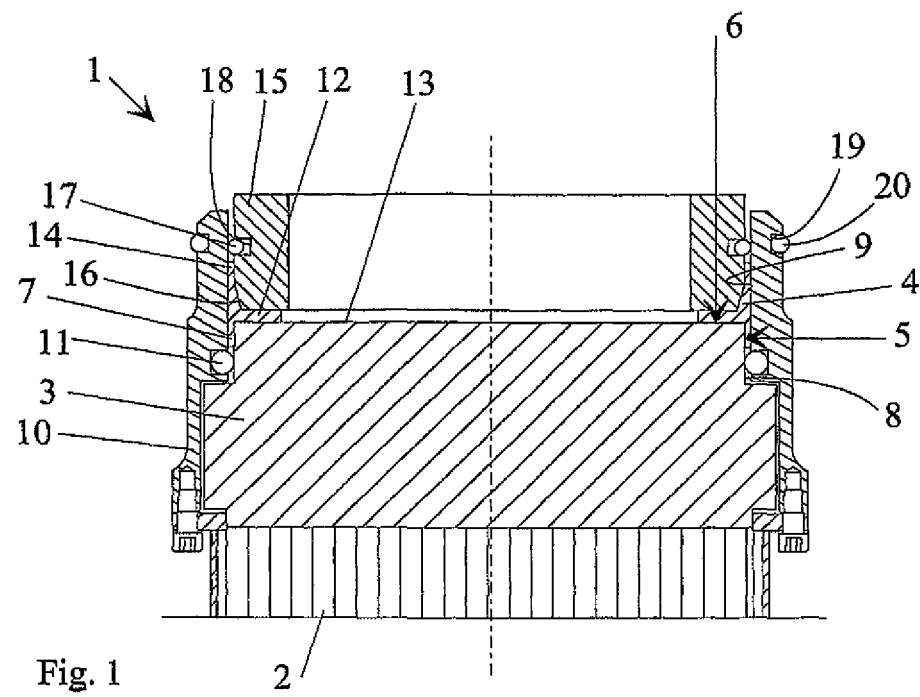
FIG. 1 is a partial, schematic section through a first membrane module for purposes of illustrating the method according to the invention.
Figure 2:
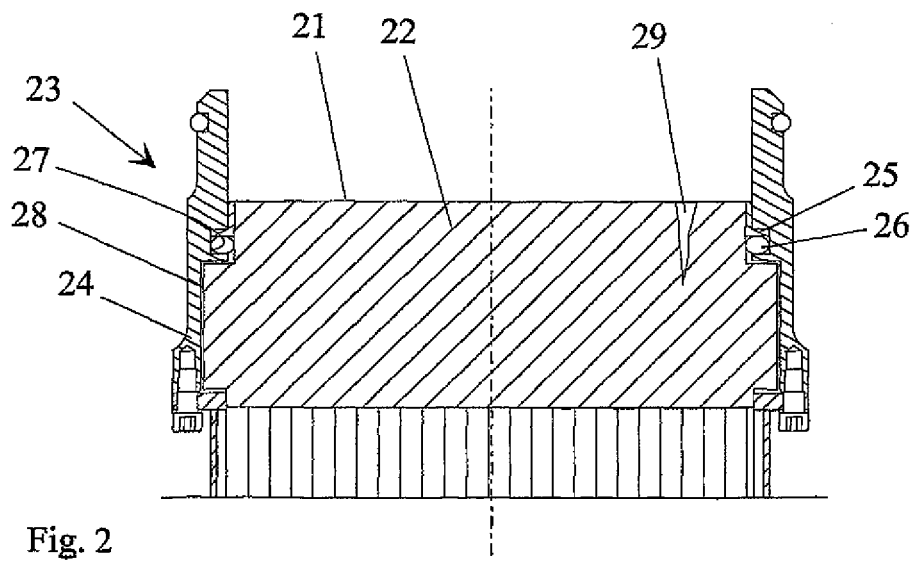
FIG. 2 is another section through a first membrane module for purposes of illustrating the method according to the invention.

A separately formed, additional sealing ring 4 is provided for sealing a membrane module 1, shown schematically in section in FIGS. 1 and 2, having a head plate 3 holding a tube bundle 2 or individual tubes. This sealing ring 4 seals cracks along the circumference, indicated by arrow 5, as well as external cracks extending axially, indicated by arrow 6. A mounting ring 10 is configured to mate with another component. An O-ring 20 in groove 19 provides a seal.

The sealing ring 4 is substantially T-shaped in cross section. One leg 7 of the three-legged sealing ring 4 extends axially in the manner of a strip and radially between the outer side 8 of the head plate 3 and an inner side 9 of the mounting ring 10 holding the head plate 3. This leg 7 of the sealing ring 4 extending axially in the manner of a strip can therefore seal radial cracks and/or fractures in the head plate 3, indicated by arrow 5, and can also take over the function of the commonly used sealing ring 11 when the function of the latter is not ensured, for example.

Another leg 12 of the sealing ring 4 overlaps an upper side 13 of the head plate 3 and, therefore, also cracks, indicated by arrow 6, which have formed there and which extend axially into the depth of the head plate 3.

The third leg 14 of the sealing ring 4, like leg 7, contacts the inner side 9 of the mounting ring 10 and is braced against the inner side 9 of the mounting ring 10 by aside 16 of an auxiliary ring 15. The leg 12 resting on the upper side 13 and leg 7 are preferably pressed axially and fill the above-mentioned axially extending cracks in the upper side 13 and also the radially extending cracks along the circumference which are located axially in front of the sealing ring 11 above the latter referring to FIG. 2. An O-ring 17 in a groove 18 of auxiliary ring 15 provides an additional seal.

With this in view, the sealing ring is advisably made of Teflon, a PTFE.

In order to build up the greatest possible axial contact pressure of the sealing ring 4 by means of the auxiliary ring 15, the latter can be braced axially against the head plate 3, e.g., by a spring against a cap, not shown in the drawing, which overlaps the head plate.

As an alternative to, or in addition to, the method mentioned above, cracks, cavities, or the like can be filled with a sealing mass, particularly a silicone-based sealing mass which is permanently elastic, has a high temperature stability and is free of solvents. A sealing mass of this kind can be a silicone rubber, or the like, to which quartz sand of suitable grain size is preferably added.

When cracks in the upper side 21 of a head plate 22 of a membrane module 23, for example, are repaired in this way by injecting a sealing mass 29, not shown to scale in FIG. 2, it may also be sufficient for re-sealing the membrane module 23 to inject a sealing mass 25 into an annular gap 28 between the head plate 22 and the mounting ring 24, possibly also axially beyond a damaged sealing ring 26 in a groove 27. Cracks along the circumference of the head plate 22 are safely sealed in this way, and the malfunctioning of the sealing ring 26 is remedied.

It is advantageous that the above-mentioned methods can be used by themselves or in combination depending upon the damage that has occurred.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for sealing a membrane module, comprising:
   placing a sealing ring having a T-shaped cross section between a head plate configured to hold a tube bundle and a mounting ring configured to hold the head plate so that a first leg of the sealing ring is in contact with a circumferential surface of the mounting ring and a circumferential surface of the head plate and a second leg of the sealing ring is in contact with an axial surface of the head plate;
   placing an auxiliary ring against the sealing ring so that the second leg of the sealing ring is in contact with an axial surface of the auxiliary ring and a third leg of the sealing ring is in contact with a circumferential surface of the auxiliary ring and the circumferential surface of the mounting ring;
   causing the first leg of the sealing ring to circumferentially seal at least a portion of the head plate; and
   causing the second leg of the sealing ring to axially seal at least the portion of the head plate.

2. The method according to claim 1, wherein the sealing ring extends axially in the manner of a strip.

3. The method according to claim 1, wherein the first leg of the sealing ring is inserted radially between the head plate and the mounting ring, the second leg of the sealing ring is braced axially against the axial surface of the head plate, and the third leg of the sealing ring is braced radially against the circumferential surface of the mounting ring by the auxiliary ring.

4. The method according to claim 1, wherein the auxiliary ring is braced axially against the head plate.

5. The method according to claim 4, wherein the auxiliary ring is braced against a cap overlapping the head plate by a force of a spring.

6. The method according to claim 1, wherein the auxiliary ring provides a radial or axial spring force.

7. The method according to claim 1, wherein causing the sealing ring to circumferentially seal at least the portion of the head plate or causing the sealing ring to axially seal at least the portion of the head plate includes injecting a sealing mass between the head plate and the mounting ring.

8. The method according to claim 5, wherein the auxiliary ring provides a radial or axial spring force.

9. The method according to according to claim 7, wherein a quartz sand is added to the sealing mass.

10. The method according to claim 6, wherein the auxiliary ring is corrugated to provide the spring force.

11. A method for sealing a membrane module, comprising:
   placing a sealing ring having a T-shaped cross section against a head plate configured to hold a tube bundle so that a first leg of the sealing ring is configured to circumferentially seal at least a portion of the head plate and a second leg of the sealing ring is configured to axially seal at least the portion of the head plate;
   bracing an auxiliary ring against the sealing ring, such that the sealing ring has a chamfered surface located between the second leg of the sealing ring and a third leg of the sealing ring when the sealing ring is in contact with the auxiliary ring;
   causing the first leg of the sealing ring to circumferentially seal at least the portion of the head plate; and
   causing the second leg of the sealing ring to axially seal at least the portion of the head plate.

12. The method according to claim 11, which includes placing the sealing ring between a mounting ring and the head plate.

13. The method according to claim 12, which includes placing the sealing ring so that the mounting ring radially braces the first and third legs of the sealing ring.

14. The method according to claim 12, which includes placing the sealing ring so that the mounting ring contacts the first and third legs of the sealing ring.

15. The method according to claim 11, wherein the auxiliary ring is axially braced against the head plate.

16. The method according to claim 15, wherein the auxiliary ring is braced against a cap overlapping the head plate by a force of a spring.

17. The method according to claim 11, wherein the auxiliary ring provides a radial or axial spring force.

18. The method according to claim 17, wherein the auxiliary ring is corrugated to provide the spring force.

* * * * *